United States Patent
Killer

(10) Patent No.: US 6,186,426 B1
(45) Date of Patent: Feb. 13, 2001

(54) COMMINUTION AND DISTRIBUTION DEVICE FOR COMMINUTABLE, PUMPABLE MATERIALS

(75) Inventor: Anton Killer, Dietramszell (DE)

(73) Assignee: SEP Gesellschaft fur Technische Studien (DE)

( * ) Notice: Under 35 U.S.C. 154(b), the term of this patent shall be extended for 0 days.

(21) Appl. No.: 09/276,748

(22) Filed: Mar. 26, 1999

(30) Foreign Application Priority Data

Mar. 26, 1998 (DE) .............................................. 198 13 485

(51) Int. Cl.$^7$ ................................................... B02C 18/06
(52) U.S. Cl. .................................. 241/46.11; 241/46.17; 241/185.6
(58) Field of Search ........................... 241/46.11, 46.17, 241/185.6; 415/121.1

(56) References Cited

U.S. PATENT DOCUMENTS

| | | | |
|---|---|---|---|
| 2,461,720 | * 2/1949 | Cawood et al. | ................... 241/46.11 |
| 2,952,448 | 9/1960 | Cornell . | |
| 3,128,051 | * 4/1964 | Smith | ................... 241/46.11 |
| 3,915,394 | 10/1975 | Ferguson, Jr. . | |
| 3,961,758 | * 6/1976 | Morgan | ................... 241/46.11 |
| 4,145,008 | * 3/1979 | Wolford | ................... 241/46.17 |
| 4,391,413 | * 7/1983 | Pack | ........................ 241/99 |
| 4,460,132 | * 7/1984 | Thumm et al. | ................... 241/46.11 |
| 4,842,479 | * 6/1989 | Dorsch | ................... 415/121.1 |
| 5,056,715 | * 10/1991 | Korsmeyer | ................... 239/214 |

FOREIGN PATENT DOCUMENTS

| | | |
|---|---|---|
| 1886102 | 10/1963 | (DE) . |
| 3719441 | 12/1988 | (DE) . |
| 195 27 784 | 1/1997 | (DE) . |
| 443 772 | 8/1991 | (EP) . |
| 44 38 105 | 5/1996 | (EP) . |

* cited by examiner

*Primary Examiner*—John M. Husar
(74) *Attorney, Agent, or Firm*—Millen White, Zelano & Branigan, P.C.

(57) ABSTRACT

The comminution and distribution device according to the invention can be used to crush comminutable, pumpable materials, in particular mechanically dewatered slurry, into roughly the same sized pieces, and feed them in controllable quantities to a downstream device, e.g., a dryer. To this end, the slurry is conveyed through a gap formed by two oppositely rotatable parts. In preferred embodiments of the device according to the invention, both parts exhibit recesses on the side facing the gap, which are designed in such a way that, when the two parts are turned opposite each other in the preset rotational direction, slurry strands with periodically alternating areas with smaller and larger cross sections are formed, transported outside and split at locations exhibiting smaller cross sections.

9 Claims, 3 Drawing Sheets

COMMINUTION AND DISTRIBUTION DEVICE FOR COMMINUTABLE, PUMPABLE MATERIALS

SUMMARY OF THE INVENTION

The invention relates to a comminution and distribution device for comminutable, pumpable materials, in particular mechanically dewatered slurry. Mechanically dewatered slurry contains foreign objects, like metal particles, small stones, hair and plastic parts, which place special demands on comminution and distribution devices. Digested slurry also contains foreign objects like these, including hair.

Such comminution and distribution devices are known from publications WO 86/07049 and DE 2356039. In the instruction contained in WO 86/07049, a slurry dewatered to a pasty consistency is pressed through a perforated matrix by means of a screw conveyor. This gives rise to sausage-shaped particles that are fed to a belt dryer. DE 2356039 discloses a slurry distribution and metering device for incinerators with grate firing, in which a slurry pre-dewatered to a water content of 75–85% first exits the distribution and metering device, and then is cut up into small pieces by a cutting device equipped with knife blades, beater blades and cutting wires.

Both devices exhibit serious disadvantages. When conveying the slurry through a perforated matrix as instructed in WO 86/07049, the danger is that individual holes will become clogged by foreign objects contained in the slurry, e.g., hair, plastic parts or wood chips. This would also occur if foreign objects removed from the slurry by pressing it through a sieve were larger than the diameter of the holes in the perforated matrix. In particular, hair ends are frequently pushed through two different holes in the perforated matrix. This narrows the cross section, and subsequently clogs the holes, so that such perforated matrixes must be cleaned frequently. To prevent such clogging, WO 86/07049 provides a compression unit in the form of a flap, whose surface equals half the area of the perforated matrix, and which can swivel around an axis that centrally halves the matrix area. While this kind of flap does ensure that not all holes in the matrix halves covered by the flap become clogged, it cannot guarantee that all holes will remain open. With respect to the cutting device described in the instruction of DE 2356039, the danger is that the knife blades, beater blades and cutting wires will encounter hard pieces of rock or metal in the slurry, causing damage or rapid wearing to the cutting device.

Therefore, the object of the invention is to provide a comminution and distribution device for comminutable, pumpable materials, in particular mechanically dewatered slurry, with which roughly the same sized pieces can be fabricated and fed in controllable quantities to a downstream device, e.g., a dryer, wherein the mentioned disadvantages of the known comminution and distribution devices are avoided.

The object of the invention is achieved via the structural features of the comminution and distribution device mentioned in the main claim.

In the following, the comminution and distribution of mechanically dewatered slurry using the device according to the invention will be described.

Shown on:

Digested and undigested slurry are normally mechanically dewatered as much as possible using centrifuges, band filter presses, chamber filter presses or similar devices before undergoing subsequent treatment procedures. As a rule, dry substance contents of between approx. 15 and 30% are achieved, depending on the slurry constitution and used dewatering devices.

In this area, the slurry can be conveyed, e.g., with a screw conveyor or thick matter pump, and also comminuted.

To prevent damage to the comminution and distribution device according to the invention by larger, hard foreign objects contained in the slurry, it makes sense to ensure that such foreign objects cannot make their way into the comminution and distribution device according to the invention. This can be accomplished, for example, by pressing the slurry through a sieve with the appropriate mesh size before it gets to the comminution and distribution device.

Figure 1:
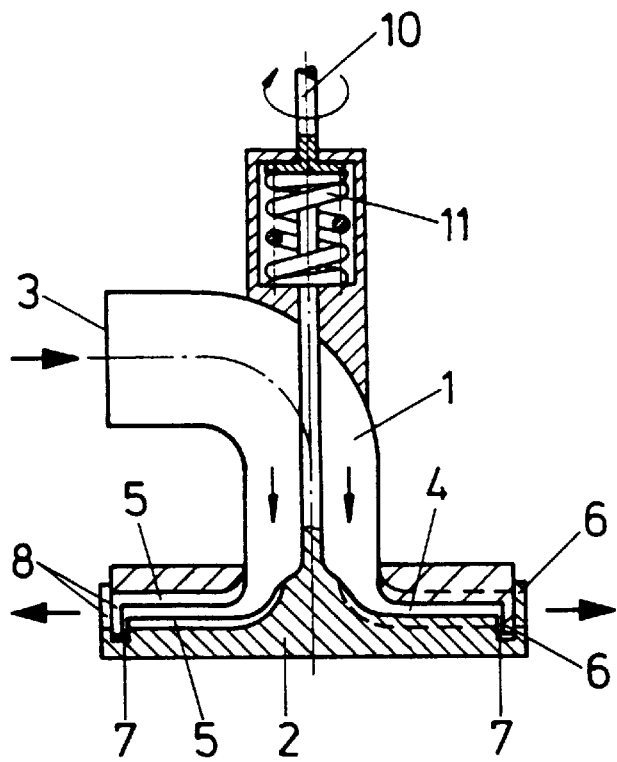
FIG. 1 is an overall view of the comminution and distribution device.

The comminution and distribution device shown on FIG. 1 consists of a fixed part (1) and a part rotatable around an axis (2). After large foreign objects have been removed from the slurry, it is transported by a conveying device, e.g., a thick matter pump, to inlet hole (3) and enters the comminution and distribution device. The inlet hole (3) exhibits a connection piece, and can be hooked up to a delivery line between the conveying device and comminution and distribution device (not shown on FIG. 1) by means of a flanged or threaded joint (also not shown on FIG. 1). Inside the comminution and distribution device, the slurry is pressed through the gap (4) between the fixed (1) and rotatable (2) part of the comminution and distribution device. Recesses (5) leading from the inside out are formed in the surfaces of the fixed and movable part facing this gap. The width of the recesses can increase from the inside out, as shown on FIG. 3 and the top part of FIG. 4.

Figure 3:
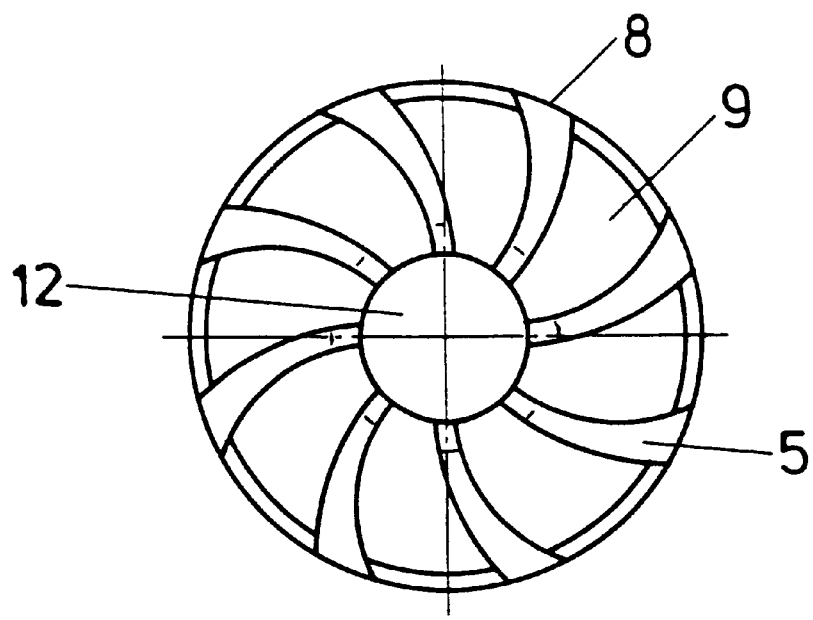
FIG. 3 is part of the device according to the invention to more clearly illustrate the transport and comminution of the slurry.
Figure 3:
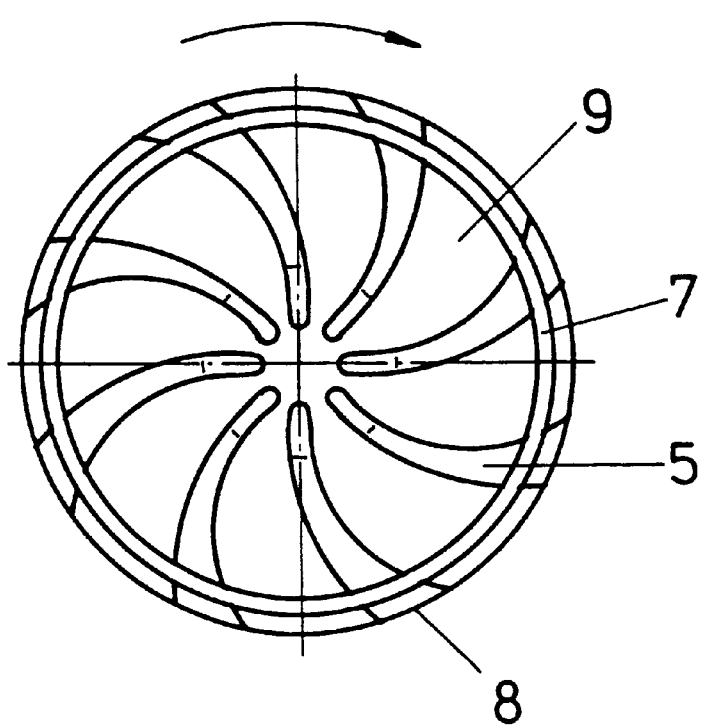
Figure 4:
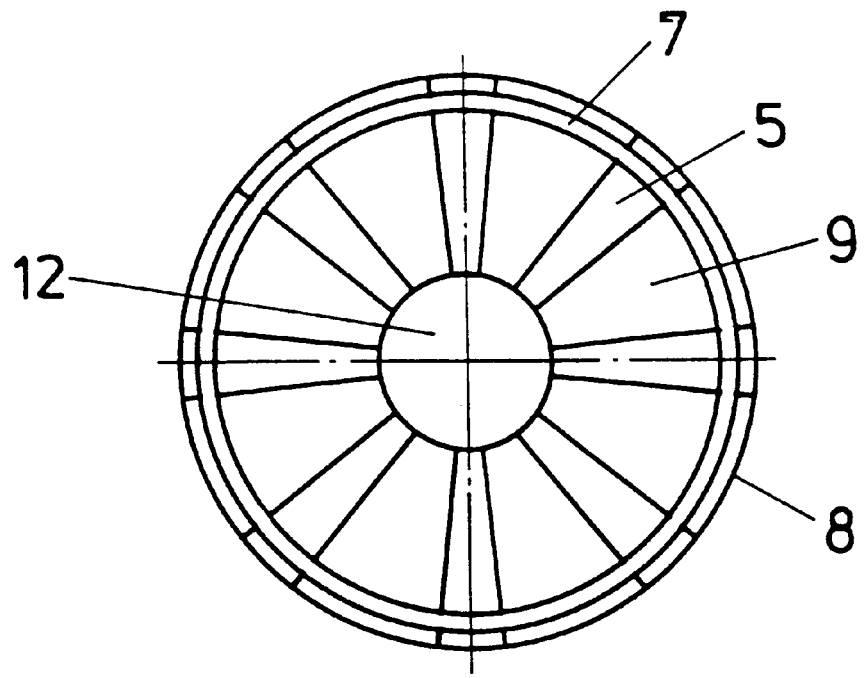
FIG. 4 is another embodiment of the part shown on FIG. 3.
Figure 4:
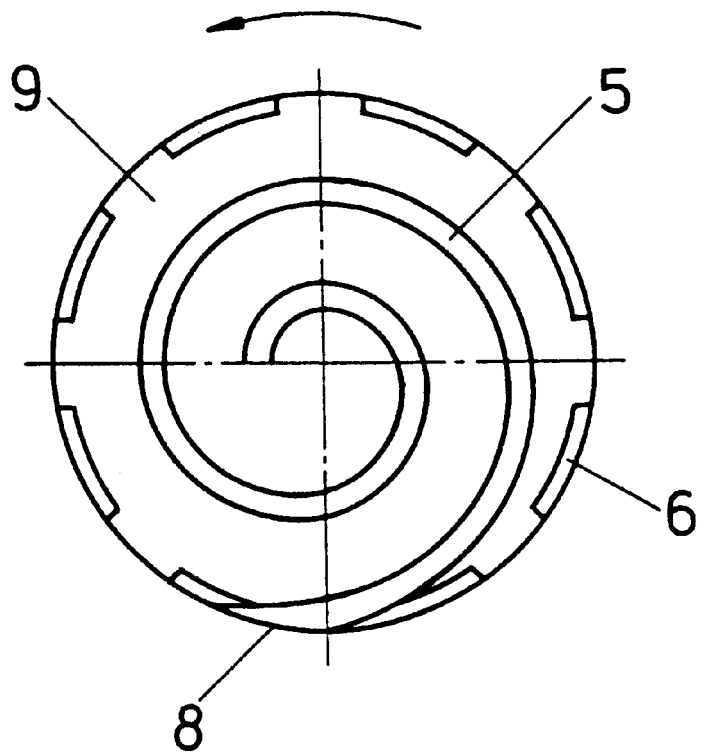

The shape of the recesses can be selected in such a way that the edges of the recesses in the fixed and rotatable part form approximate right angles at locations where they cross. This shaping ensures that the slurry strands will be divided into areas with a larger and smaller cross section inside the comminution and distribution device already. The areas with the larger cross section are pushed toward the outlet holes along the recesses in the fixed part when the moveable part is turned in the designated rotational direction. In this kind of design, larger foreign objects are concentrated in the areas with a larger cross section. The slurry strands can also be divided in this way into areas with various cross sections if the recesses do not cross at a right angle. FIGS. 3 and 4 show various shapes for the recesses.

Therefore, the slurry strands pushed through the outlet holes (8) exhibit areas with larger and areas with smaller cross sections at regular intervals. Both the fixed and rotatable parts have teeth (6) at the edge, extending the webs (9) between the recesses (5). These teeth divide the exiting slurry strands into the areas with a smaller cross section. Equally large slurry particles are generated in this way. Since larger, hard foreign objects are concentrated in the areas with a larger cross section, the teeth (6) are largely protected against damage by hard foreign objects. The danger of such damage can be reduced even further by making the teeth (6) somewhat less wide than the webs (9), and by shifting the teeth on the webs a little to the back. If the front edge of the teeth (6) is slanted, so that the top edge of the teeth (6) facing the gap (4) becomes smaller than the base connected with the fixed or rotatable part, foreign objects that were not severed by the teeth, e.g., hair, can slide to the top edge and over the teeth. This ensures that slurry constituents will not jammed in the teeth in a way that impairs the function of the device. On FIG. 3, the diameter of the rotatable part (bottom half of FIG. 3) is somewhat larger than the diameter of the fixed part (top half of FIG. 3), and provided along the edge with a groove (7) engaged by the teeth of the fixed part. As shown on FIG. 4, it is also possible to make the diameter of the fixed part (top half of FIG. 4) larger than the diameter of the rotatable part (bottom half of FIG. 4), and provide the fixed part (2) with a circular groove along the edge engaged by the teeth (6) of the rotatable part. To enhance the cutting action, the front edges of the teeth can be ground. A groove (7) is not absolutely necessary, but does make it easier to center the fixed and moveable part, i.e., the rotational axis (10) of the movable part (2) is simultaneously the symmetrical axis of the lower section of the fixed part (1).

For substances that tend to stick together or agglomerate, it is advantageous, as shown on FIGS. 3 and 4, to make the webs (9) wider than the recesses (5), so that the teeth (6) situated on the edge of the webs (9) can be wider than the outlet holes (8). This is because, if the teeth (6) are wider than the outlet holes (8), a certain period of time passes after separation of the slurry particles until the slurry strands can exit from the outlet holes (8) again. This reduces the danger that consecutively separated slurry particles will stick together and agglomerate.

The slurry can be divided into areas with larger and smaller cross sections inside the comminution and distribution device in various ways. In the example shown on FIG. 4, the recesses (5) in the fixed part depicted in the top half of FIG. 4 proceed radially toward the outside, while the rotatable part depicted in the bottom half of FIG. 4 contains one or more spiral-shaped recesses, which cross the recesses in the fixed part at approximately a right angle. As in the variant of the device according to the invention shown on FIG. 3, the slurry strand areas with larger and smaller cross sections are also pushed along the recesses in the fixed and rotatable part to the outlet holes while turning the rotatable part in the variant shown on FIG. 4.

In the variant shown on FIG. 3, the recesses in the fixed and moveable part are equally long, and both parts have the same number of recesses. By contrast, in the variant shown on FIG. 4, the recesses in the fixed part point directly toward the outside, i.e., are as short as possible, while the path from the inside out is much longer in the moveable part due to the spiral-shaped recess. This type of arrangement makes it possible to take into account that slurry transport to the outside in the recesses of the rotatable part is supported by centrifugal force. Another way to shorten the recesses in the fixed part as much as possible, and hence to reduce friction resistance and the danger of clogging, is by enlarging the central hole (12).

The center lines of the recesses in the fixed and moveable part need not cross at an angle of approximately 90° as shown for the variant on FIG. 4, but rather can cross at a considerably smaller angle, as shown on FIG. 3. Even at crossing angles other than 90°, the slurry strands are divided into areas with larger and smaller cross sections, with these areas being pushed to the outside in the directions designed on FIGS. 3 and 4 when the rotatable part is turned. If the recesses cross at an angle of 90°, the areas with a larger and smaller cross section are conveyed to the outside parallel to the center line of the recesses (5). If the crossing angle deviates by a certain amount, i.e., at a crossing angle of 90°−x, the slurry areas with a larger and smaller cross section are no longer conveyed to the outside in a parallel fashion, but at angle x to the center line of the recesses (5). While this increases the frictional resistance, a larger number of recesses can be incorporated in the rotatable and fixed part by doing without a crossing angle of approximately 90°.

Figure 2:
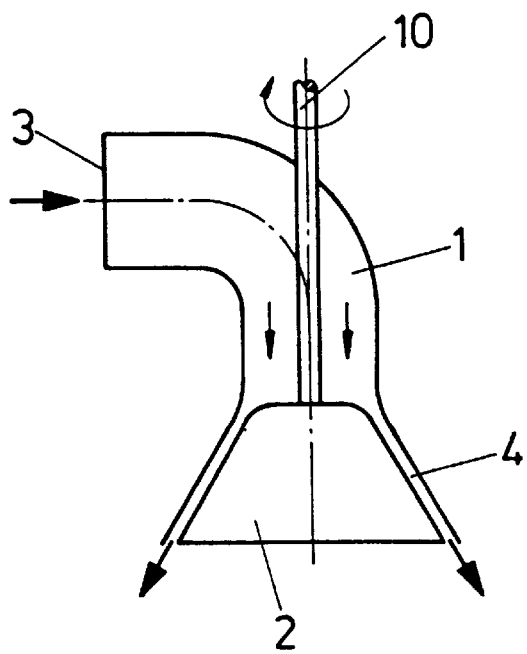
FIG. 2 is an overall view of another embodiment of the comminution and distribution device.

In the device shown on FIG. 1, the slurry exits the comminution and distribution device in a plane situated perpendicular to the rotational axis (10). Other exit angles are also possible. For example, FIG. 2 presents a schematic view of an embodiment of the device according to the invention, in which the slurry exits the device along an envelope of cone at an angle of 30° relative to the rotational axis (10). Altering the exit angle makes it possible to vary the area into which the comminuted slurry pieces are conveyed, and adjust it to the requirements of the respective application.

FIGS. 1 and 2 show preferred embodiments of the device according to the invention. Additional variants are possible. For example, the drive shaft need not be routed through the slurry supply line; the rotatable part could also be driven from below.

In addition, the two parts forming the gap (4) can be made to rotate, or the rotatable part shown on FIGS. 1 and 2 can be fixed, and the fixed part shown on FIGS. 1 and 2 can be made to rotate instead. In these cases, the slurry supply line need not be rigidly connected with the two parts forming the gap (4), or must only be rigidly connected with the respective fixed part.

Changing the speed of the slurry conveying device, e.g., a thick matter pump, makes it possible to vary the slurry stream conveyed by the comminution and distribution device. The size of the generated slurry particles can be varied by changing the speed of the rotatable part of the comminution and distribution device. The higher the speed of the thick matter pump and the smaller the speed of the rotatable part, the larger the slurry particles generated.

If the objective is to comminute and distribute materials that place less demand on comminution and distribution devices than mechanically dewatered slurry, or if comminution need not result in the same sized pieces, use can be made of simplified variants of the device according to the invention. For example, if one eliminates the teeth at the edge of the fixed part (1) or the teeth at the edge of the rotatable part (2), then slurry strands with periodically changing cross section exit from the outlet holes, which are no longer cut into small pieces by the still present teeth. The areas of the slurry strand with a smaller cross section form predetermined breaking points, at which the slurry strand can split given the right consistency, e.g., under its own weight.

If recesses are omitted from the fixed part and the rotatable part is fabricated without teeth or, vice versa, if recesses are omitted from the rotatable part and the fixed part is fabricated without teeth, the strands with a constant cross section exit the outlet holes and are cut into same-sized pieces by the teeth, wherein the size of the generated pieces can be varied by changing the speed of the rotatable part. The size of the pieces can also be changed by varying the speed of the thick matter pump.

The generation of same-sized slurry particles is required by several different applications, e.g., if the dried slurry is to be burned or brought out as a fertilizer. Already in the drying process, comminution into same-sized pieces is most often advantageous, since larger pieces require longer drying times for almost all drying procedures. By contrast, the generation of same-sized particles is not that important in applications where the dried slurry is pulverized, e.g., for use as an additive.

The movement of the rotatable part relative to the fixed part coupled with the formation of slurry areas with larger and smaller cross sections effectively prevents a clogging of the comminution and distribution device, and the danger of damage to the teeth (6) by foreign objects contained in the slurry.

The shape and size of the areas with larger and smaller cross sections can be tailored to various needs by changing the shape of the recesses. In addition, the length correlation between sections of slurry strands exiting from the outlet holes with a larger and smaller cross section can be varied by changing the width correlation of the webs between the recesses and the outlet holes.

Any and all precautions notwithstanding, it must be expected that malfunctions or errors will result in clogs or excessively large, hard foreign objects will get into the comminution and distribution device. To avoid operational failures and prevent damage to the device according to the invention in cases like these, the moveable part as depicted on FIG. 1 can be held in its normal position, e.g. by a spring (11). Clogs most often arise in the narrowest areas, i.e., in the gap between the rotatable and fixed part. Given such a clog, the pressure on the rotatable part increases, the spring (11) is compressed, the rotatable part shifts along the rotational axis (10) and the gap widens. This eliminates the clog, and excessively large foreign objects can be removed from the device according to the invention without having to face operational failures or damages.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above, and of German Application No. 198 134 85.1 filed Mar. 26, 1998, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A comminution and distribution device comprising a slurry supply line supplying comminutable, pumpable materials, to two parts forming a gap (4) therebetween, in which materials to be comminuted are conveyed toward an outside of the device through gap (4), wherein at least one part of the two parts that form the gap (4) is rotatable along a rotational axis (10), and wherein at least one recess (5) is incorporated in a surface of at least one part of the two parts that form the gap (4), said surface facing the gap, said recess starting at an area near rotational axis (10) and proceeding up to an edge of the part containing the recess, wherein an edge of one of the two parts that form the gap (4) projects over an edge of the other part, and that at least one section of the two parts that form the gap (4) is provided on the edge with teeth (6) facing the gap (4).

2. A device according to claim 1, wherein the rotational axis of the rotatable part is situated perpendicular to a plane defined by the gap (4).

3. A device according to claim 1, characterized by the fact that the gap (4) between the two parts that form the gap (4) corresponds to the generated surface of a truncated cone.

4. A device according to claim 1, wherein a cross section of at least one of the recesses increases steadily from inside out.

5. A device according to claim 1, wherein both parts that form gap (4) exhibit recesses (5), a center line of which crosses at an angle of approximately 90° at every angle of rotation.

6. A device according to claim 1, wherein one of the two parts that form the gap (4) is not rotatable and rigidly connected with a slurry supply line.

7. A device according to claim 1, wherein the two parts that form the gap (4) are provided on the edge with teeth, which completely cover and completely release outlet holes (8) in chronological sequence when turning the rotatable part or when turning the two parts that form the gap (4) against each other.

8. A device according to claim 7, having webs (9) between recesses (5) and having teeth (6) on the outside edge of webs (9) wider than outlet holes in both of the parts that form the gap (4).

9. A device according to claim 1, wherein, when pressure between the two parts that form the gap (4) increases to over a preset level, one part is shifted in the direction of rotational axis (10) in such a way that the gap (4) widens.

* * * * *